United States Patent Office 3,829,306
Patented Aug. 13, 1974

3,829,306
PLANT REGULATION WITH 2-HALO-2',6'-DISUB-
STITUTED-N-AMIDOMETHYL-ACETANILIDES
Kenneth Wayne Ratts, Creve Coeur, Mo., assignor to
Monsanto Company, St. Louis, Mo.
No Drawing. Filed June 21, 1972, Ser. No. 265,094
Int. Cl. A01n 5/00
U.S. Cl. 71—76       14 Claims

ABSTRACT OF THE DISCLOSURE

The natural growth or development of plants is regulated by an application of a 2-halo-2',6'-disubstituted-N-amidomethyl-acetanilide to said plants.

---

This invention relates to a method for regulating the natural growth or development of plants by means of chemical treatment. More particularly, this invention is concerned with a method wherein growing plants are treated with a chemical substance which alters their natural growth or development to enhance various agricultural or horticultural features of the plants. As employed herein, the term "natural growth or development" designates the normal life cycle of the plant in accordance with its genetics and its environment, in the absence of artificial, external influences.

It is to be understood, at the outset, that the regulation of natural growth and development hereinafter discusesd does not include killing or herbicidal action. Although phytotoxic or lethal amounts of the materials disclosed herein might be employed to destroy certain plants, it is contemplated here to employ only such amounts of said materials as will serve to regulate the natural growth and development of useful plants without substantial injury. As may be expected, and as long understood by those skilled in the art, such effective plant regulating amounts will vary, not only with the particular material selected for treatment, but also with the regulatory effect to be achieved, the species of plant being treated and its stage of development, and whether a permanent or transient regulating effect is sought. Other factors which may bear upon the determination of an appropriate plant regulating amount include the plant growth medium, the manner in which the treatment is to be applied, weather conditions such as temperature or rainfall, and the like.

In accordance with the instant invention it has been found that desirable regulation of natural plant growth or development is achieved by application of a 2-halo-2',6'-disubstituted-N-amidomethyl-acetanilide, as hereinafter defined, to plants in various stages of development. Accordingly, in the practice of this invention the acetanilide can be applied to the plant in the seedling stage, flowering stage, fruiting stage or maturing stage and the like or can be applied to plants at more than one stage of development. Such application may be made directly to one or more of the plant's parts, such as, roots, stems, leaves, flowers, fruit or the like or application can be made indirectly as by treatment of the growth medium of the plant.

An embodiment of this invention is the method of regulating the natural growth or development of plants which comprises applying to said plants an effective plant-regulating, nonlethal, amount of a compound selected from those having the formula

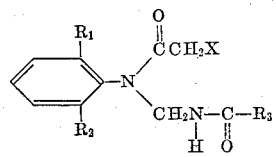

wherein $R^1$ is methyl, ethyl or methoxy, $R^2$ is methyl, ethyl or tert. butyl, $R^3$ is hydrogen, alkyl, alkenyl, or alkoxyalkyl each of not more than 3 carbon atoms and X is chloro or bromo. Preferably X is chloro. A particularly preferred class of compounds useful in the practice of this invention are those of the above formula wherein $R^1$ and $R^2$ are methyl or ethyl.

The active acetanilides of the above formula can be prepared by a carbonium ion type reaction of a 2-halo-N-(substituted methyl) acetanilide with a nitrile or inorganic cyanide under acid conditions. The methyl substituent can be any group that is capable of forming a carbonium ion and is readily displaced under acidic conditions such as halo, alkoxy, hydroxy and similar leaving groups.

Illustrative of the preparation of the acetanilides of the above formula is the following.

Approximately 200 parts of 2-chloro-2',6'-diethyl-N-(chloromethyl) acetanilide are added to 400 parts of concentrated sulfuric acid. To the mixture cooled to about 10° C. is added about 70 parts of sodium cyanide and the mixture is heated to about 50° C. The reaction is exothermic and the temperature rises to about 85° C. The reaction mixture is cooled, poured into ice water, extracted with methylene dichloride washed and dried. The product is crystallized from ether and recrystallized with a mixture of methylcyclohexane and toluene to yield 2-chloro - 2',6' - diethyl-N-(formamidomethyl) acetanilide, m.p. 85–89° C.

About 0.36 gram mol of 2-chloro-2',6'-diethyl-N-(chloromethyl) acetanilide is mixed with about 0.4 gram mol acetonitrile and is slowly added to about 100 ml. 96% cold sulfuric acid in a suitable vessel on an ice bath. The reaction is exothermic with the temperature increasing from 5° to about 15° C. The reaction mixture removed from the ice bath is permtited to warm to room temperature with stirring. The mixture is poured into ice water, filtered and washed. The product is dried and recrystallized from ethylacetate to yield 2-chloro-2',6'-diethyl-N-(acetamidomethyl) acetanilide, m.p. 148–149° C.

Using the above described procedures other acetanilides of the above formula are conveniently prepared. Further details of the preparation of these acetanilides are found in copending application Ser. No. 148,893 filed June 1, 1971 and are incorporated herein by reference.

Regulation of the natural growth or development of plants by chemical treatment may result from the effect of the chemical substance on the physiological processes of the plant, or it may be due to the effect of such substance on the morphology of the plant. As should be readily apparent, said regulation may also result from a combined or sequential effect of the chemical in the areas of both physiology and morphology.

In general, regulation of the natural growth or development which leads to a morphological change in the plant is readily noticeable by visual observation. Such changes can be found in the size, shape, color or texture of the treated plant or any of its parts. Similarly, changes in the quantity of plant fruit or flowers can be simply noted.

On the other hand, regulation which leads to changes in the physiological processes occur within the treated plant and are usually hidden from the eye of an observer. Changes of this type are most often in the production, location, storage or use of naturally occurring chemicals, including hormones, within the plant. Physiological changes in a plant may be recognized when followed by a subsequent change in morphology. Additionally, there are numerous analytical procedures known to those skilled in the art for determining the nature and magnitude of changes in the various physiological processes.

The individual compounds of the instant invention serve to regulate the natural growth or development of treated plants in a number of diverse ways, and it is to be understood that each compound may not produce identical regulatory effects on each plant species or at every rate of application. As stated above, responses will vary in accordance with the compound, the rate, the plant, etc.

A regulatory response demonstrated by the acetanilides useful in the practice of this invention can be generally termed retardation of vegetative growth and such a response has a wide variety of beneficial features. In certain plants this retardation of vegetative growth causes a diminution or elimination of apical dominance leading to a shorter main stem and increased lateral branching. This regulation of the natural growth or development of plants produces smaller, bushier plants which often demonstrate increased resistance to drought, lodging, temperature extremes, pest infestations and the like. Thus, the method of this invention provides for plants that are in a good state of health and tends to produce more vigorous plants.

In many types of plants, such as silage crops, potatoes, sugar cane, beets, grapes, melons and fruit trees, the retardation of vegetative growth caused by compounds of this invention results in an increase in the carbohydrate content of the plants at harvest. It is believed that by retarding or suppressing such growth at the appropriate stage of development, less of the available carbohydrate is consumed as plant food with a consequent enhancement of the starch and/or sucrose content.

Also with fruit trees, such as in apple orchards, retardation of vegetative growth is demonstrated by shorter branches which lead to more fullness in shape and may also result in lesser vertical elongation. These factors contribute to the ease of access to the orchard and simplify the fruit harvesting procedure.

As illustrated in the examples which are hereinafter presented, the individual acetanilides of the above formula regulate the natural growth or development of treated plants in numerous other and different respects. Included among these other regulatory effects are the inducing of axillary bud development, the alteration of leaf shape, the delay or acceleration of fruit or pod set, etc. Although regulatory effects such as those described above can be desirable, often it is the ultimate result of these effects upon the economic factor which is of primary significance in crop plants or upon the aesthetic factor in ornamental plants. Thus, it must be recognized that increases in yield of individual plants, increases in the yield per unit of cropping area, improvement in the quality of the plants' product, improvement in the plants vigor and reductions in the cost of harvesting and/or subsequent processing are all to be considered in any assessment of the consequence of an individual regulatory effect during the growth or development of a plant.

Representative acetanilides of the foregoing formula useful in the practice of this invention include:

I. 2-chloro-2',6'-diethyl-N-(acetamidomethyl) acetanilide
II. 2-chloro-2'-methyl-6'-ethyl-N-(acetamidomethyl) acetanilide
III. 2-chloro-2',6'-diethyl-N-(methoxyacetamidomethyl) acetanilide
IV. 2-chloro-2',6'-diethyl-N-(formamidomethyl) acetanilide
V. 2-bromo-2',6'-dimethyl-N-(acetamidomethyl) acetanilide
VI. 2-bromo-2'-methoxy-6'-*tert*. butyl-N-(acetamidomethyl) acetanilide
VII. 2-chloro-2'-ethyl-6'-*tert*. butyl-N-(acetamidomethyl) acetanilide
VIII. 2-bromo-2'-ethyl-6'-*tert*. butyl-N-(acetamidomethyl) acetanilide
IX. 2-chloro-2',6'-diethyl-N-(propionamidomethyl) acetanilide
X. 2-chloro-2',6'-dimethyl-N-(acetamidomethyl) acetanilide
XI. 2-chloro-2'-methyl-6'-*tert*. butyl-N-(formamidomethyl acetanilide
XII. 2-bromo-2'-methyl-6'-*tert*. butyl-N-(formamido methyl) acetanilide
XIII. 2-chloro-2',6'-diethyl-N-(3-methoxypropionamidomethyl) acetanilide
XIV. 2-chloro-2'-methyl-6'-*tert*. butyl-N-(acetamidomethyl) acetanilide
XV. 2-bromo-2'-methyl-6'-*tert*. butyl-N-(acetamidomethyl) acetanilide
XVI. 2-bromo-2',6'-diethyl-N-(acetamidomethyl) acetanilide
XVII. 2-chloro-2',6'-diethyl-N-(isobutyramidomethyl) acetanilide
XVIII. 2-chloro-2',6'-diethyl-N-(butyramidomethyl) acetanilide
XIX. 2chloro-2',6'-diethyl-N-(acrylamidomethyl) acetanilide
XX. 2-chloro-2,6'-diethyl-N-(3-butenamidomethyl) acetanilide.

In practicing the plant regulating methods of this invention the acetanilides generally are applied to plants in the form of a composition containing one or more materials referred to in this art as an adjuvant in liquid or solid form. Suitable plant regulating compositions are prepared by admixing the acetanilide with an adjuvant including diluents, extenders, carriers, surfactants, foaming agents and conditioning agents to provide compositions in the form of finely divided particulate solids, granules, pellets, wettable powders, dusts, solutions, foams and aqueous dispersions or emulsions. Thus, the active acetanilide can be used with an adjuvant such as a finely divided particulate solid, a solvent liquid of organic origin, water, a foaming agent, a surface active agent, such as, wetting agents, dispersing agents, suspending agents and emulsifying agents or any suitable combination of such adjuvants. These compositions aid in the application of a uniform distribution of the active acetanilide (active ingredient) to plants.

In selecting the appropriate non-herbicidal rate of application of the active ingredient it will be recognized that precise dosages will be dependent upon the plant species being treated, the particular plant part or habitat to which application is made, the development stage of the plant, the particular acetanilide employed, the mode of application, such as soil incorporation, band application, broadcast application, foliar application and various other factors known to those skilled in the art. In foliar treatment for the regulation of plant growth, the active ingredients are applied in amounts from about 0.05 to about 10 or more pounds per acre. Foliar applications of from 0.1 to 5 pounds of the active ingredient per acre are preferred. In applications to the soil habitat of seedlings and established vegetation for the regulation of plant growth, the active ingredients are applied in amounts of from about 0.01 to about 20 pounds per acre or more. Preferably, the active ingredients are applied to the soil at a rate of from 0.1 to 10 pounds per acre. Foliar applications to plants at the blooming stage, e.g. 10% blossoms, are particularly advantageous and are preferred.

The useful and unexpected plant growth regulating properties of the acetanilides of the foregoing formula are demonstrated by exemplary tests on representative mono and dicotylendonous plants set forth below. In the following tests the chemical was applied as an aqueous composition at the equivalent rate of active acetanilide indicated. The aqueous compositions were prepared by solubilizing the required amount of the chemical in a volume of acetone which is further admixed with a like volume of 0.05% by weight aqueous solution of dioctyl sodium sulfosuccinate, surface-active agent, to provide sufficient composition which is applied at the rate equivalent to 200 gallons per acre to apply the active acetanilide at the equivalent rate indicated.

EXAMPLE 1

A number of soybeans plants, representative of dicotyledonous plants, are grown from seed in aluminum pans in a greenhouse for a period of approximately one week to the primary leaf stage. The plants are thinned to three uniform plants in each pan and the weight of each plant is measured to the terminal bud and the average height is noted. One pan containing three soybean plants is used for each chemical treatment and four pans are not treated and used as a control. The aqueous composition of the chemical is then applied to the pan of growing plants by overhead spray at an established rate expressed as pounds per acre. The treated pans along with the control pans, are watered from below, fertilized and otherwise maintained in a greenhouse under uniform growth conditions. Two weeks after application of the chemical the average height of the plants in the treated pan is determined as above and the difference in the average height before and two weeks after application represents the development of the treated plants. This development in growth of the treated plants is compared to the average development in growth of the plants in the control pans during the same period of time. A variation of 25% or more in the development of at least two-thirds of the treated plants when compared to the development of the control plants demonstrates that the chemical is effective for regulating the natural growth or development of the plants. Accordingly, a chemical is considered effective when the treated plants manifest at least a 25% decrease in height development when compared to the untreated control plants, i.e. retardation of vegetative growth.

Using the procedure of Example 1 compounds I, II, III, X, XI and XVI demonstrated effective retardation of vegetative growth when applied to the plants at the primary leaf stage at a rate equivalent to about 3 pounds per acre. At this rate the activity was accompanied by severe leaf burn with compound II and slight leaf burn with compounds X and XI. Compounds II and XI when applied at a rate equivalent to about 1.2 pounds per acre to the plants at the primary leaf stage demonstrated effective retardation of vegetative growth without any burning of the leaves.

EXAMPLE 2

A number of corn plants, representative of monocotyledonous plants, are grown from seeds in aluminum pans for a period of about one week after emergence. Then the corn plants are thinned to 3 uniform plants per pan and the average height of the plants to the top of the whorl is determined and noted. One pan containing 3 corn plants is used for each chemical treatment and four pans are not treated and used as a control. The aqueous composition of the chemical is then applied to the pan of growing plants by overhead spray at an established rate expressed in pounds per acre. The treated plants along with the control pans are watered from below, fertilized and otherwise maintained in a greenhouse under uniform growth conditions. Two weeks after application of the chemical the average height of the plants in the treated pan is determined as above and the difference in the average height before and two weeks after application represents the development of the treated plants. This development in growth of the treated plants is compared to the average development in growth of the plants in the control pans during the same period of time. A variation of 25% or more in the development of at least two-thirds of the treated plants when compared to the development of the control plants demonstrates that the chemical is effective for regulating the natural growth or development of the plants. Thus, a chemical is active when the treated plants manifest at least a 25% decrease in height development when compared to the untreated control plants, i.e. retardation of vegetative growth.

Using the procedure set forth in Example compounds I, IV, XVIII and XIX demonstrated effective retardation of vegetative growth when applied at a rate equivalent to about 6 pounds per acre. At an application rate equivalent to about 3 pounds per acre compounds II, III, VI, IX, X, XII and XX demonstrated effective retardation of vegetative growth.

Corn plants growing in sample plots in the field were treated with an overhead spray of an aqueous composition containing compounds II, III, VI and X as the sole active ingredient. The plants were at the 5 weeks old stage of development at the time of treatment with the composition at a rate equivalent to about one-half pound active ingredient per acre. Two weeks after treatment the plants treated with II and with III were reduced in total height more than 15% when compared to untreated control plants. Plants treated with compounds VI and X demonstrated two weeks after treatment a total height reduction less than 15% as compared to the untreated control plants and were considered comparable to the control plants. At maturity the corn plants treated with compounds VI and X demonstrated a total height reduction in excess of 15% when compared to the untreated control plants.

EXAMPLE 3

In this evaluation soybean plants growing in individual pots which were 4 weeks old (3–4 trifoliate stage) and 6 weeks old (5–6 trifoliate stage) were used for each application of chemical. An overhead spray of an aqueous composition of the chemical is applied to 2 pots at each growth stage at an equivalent rate as indicated below. Two to four sets of plants which receive no chemical application are included and serve as controls. All of the pots are maintained under good growing conditions and are watered and are uniformly fertilized under uniform conditions. Two weeks after the application of the chemical the growth response of the treated plants are compared with that of the control plants. The total height of the plant is measured to the tip of the terminal bud. A decrease of 15% or more in the average total height of the treated plants, when compared to that of the control plants, demonstrates that the chemical is effective for regulating the natural growth or development of the plants. In addition to this retardation of vegetative growth other observations indicating a response in the plants treated with chemicals of this invention were noted.

Employing the procedure of Example 3, compounds I and II demonstrated effective plant growth regulation at both the 3–4 trifoliate and the 5–6 trifoliate stage of development. Compound I applied at a rate equivalent to about 2.5 pounds per acre to plants 4 weeks old and to plants 6 weeks old at the time of treatment elicited a growth response in the plants resulting in plants reduced in height in excess of 15%. This response was accompanied by a slight burning of the leaves, inducement of axillary bud development and altered canopy. The plants treated at the 5–6 trifoliate stage also demonstrated a darker foliar color and enhanced pod set. Plants treated with compound I at a rate equivalent to about 1 pound per acre demonstrated effective height reduction when applied to 4 weeks old plants and to 6 weeks old plants. Plants treated with compound II at a rate equivalent to about 1 pound per acre demonstrated effective height reduction when applied to plants either at the 3–4 trifoliate or the 5–6 trifoliate stage of development. The 4 weeks old plants at time of treatment also showed slight leaf burn and altered canopy and the 6 weeks old plants at time of treatment showed altered canopy and a delay in pod set. Compound II at a rate equivalent to about one-half pound per acre was effective in eliciting height reduction in plants treated at the 3–4 trifoliate and the 5–6 trifoliate stage of development.

Soybean plants growing in sample plots in the field with about 9 plants per row foot and 30 inch rows (normal population density) and about 9 plants per row foot and 12 inch rows (excessive population density) were used to evaluate the effect of chemical treatment upon the yield of the plants. The plants were treated early in the flowering stage, i.e. approximately 10% blooms, with an aqueous composition of compound I using an overhead spray to apply the chemical at a rate equivalent to about 0.4 pound per acre to the plants in the 30 inch rows and at a rate equivalent to about 1 pound per acre to the plants in 12 inch rows. These rates of applications did not significantly alter the height of the treated plants. At harvest the treated plants demonstrated significant improvement in pod yield, seed yield and pod number without any significant change in seed size when compared to that of the control plants. This improvement in the yield capacity of soybeans treated in accordance with this invention is particularly advantageous in improving yields of plants under stress of high density populations.

EXAMPLE 4

In this test grass plants were employed to demonstrate a regulatory effect on the vegetative growth of turf. Kentucky 31 fescue is grown in pots and maintained in a greenhouse under good growth conditions. Each pot of grass is uniformly watered and fertilized and the grass is initially clipped after two weeks of growth to height of about 6 to 7 cm. and then clipped every 3 to 5 days depending on the growth rate. The chemical is applied as an aqueous composition using an overhead spray at a rate expressed in pounds per acre to the pots of grass when the grass is approximately 4 weeks olds. Three pots of grass are used for each treatment and compared to that of untreated control plants two weeks after application of the chemical.

Using the procedure of Example 4 grass treated with compounds I, XIII and XX applied at a rate equivalent to about 5 pounds per acre demonstrated 25% or greater reduction in growth over the two week test period when compared to that of the controls.

An aqueous composition of compound I was applied to established K–31 fescue turf in field plots after the first mowing at rates equivalent to about 2 and about 4 pounds per acre. Two weeks after treatment both rates were effective in retarding the growth of the fescue when compared to the untreated control. This effect was maintained through 8 weeks of growth. Four weeks after treatment the treated grass was reduced in height at least 25% when compared to the untreated control. After 8 weeks the treated grass was approximately 50% as high as the untreated control. Visual observations indicated that the treated grass was not damaged and slightly greener than the control grass.

From the illustrative examples above it should be clear that the regulatory response will be dependent upon the compound employed, the rate of application, the plant specie and its stage of development and other factors well understood by those skilled in the art.

In utilizing the methods of this invention it is advantageous to treat crops planted at excessive populations per unit area with an effective nonlethal amount of the acetanilide to elicit a growth response in the plant which compensates for the overcrowding in the field and the usual reduction in yield.

The methods of this invention can be conveniently carried out in conjunction with agronomic practices such as treating the plants with insecticides, fungicides, nematocides, fertilizer and the like. The application of compositions containing an acetanilide as herein defined and other agricultural chemicals such as selective herbicides, insecticides, fungicides, fertilizers, nematocides and the like are particularly advantageous for obtaining the desired results with minimum treatment costs.

Although this invention has been described with respect to specific modifications, the details thereof are not to be construed as limitations, for it will be apparent that various equivalents, changes and modifications may be resorted to without departing from the spirit and scope thereof and it is understood that such equivalent embodiments are intended to be included herein.

The embodiments of the invention in which an exclusive property or privilege is claimed are defined as follows:

1. A method of retarding the natural growth of desirable plants which comprises applying to said plants an effective, nonlethal, amount of a compound selected from those having the formula

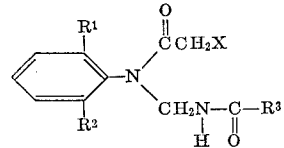

wherein:

$R^1$ is methyl, ethyl or methoxy;
$R^2$ is methyl, ethyl or *tert.* butyl;
$R^3$ is hydrogen, alkyl of not more than 3 carbon atoms, alkenyl of not more than 3 carbon atoms, or alkoxyalkyl of not more than 3 carbon atoms; and
X is chloro or bromo.

2. The method of claim 1 wherein X is chloro.
3. The method of claim 1 wherein the plants are dicotyledons.
4. The method of claim 1 wherein the plants are monocotyledons.
5. The method of claim 2 wherein $R^1$ and $R^2$ are ethyl.
6. The method of claim 2 wherein $R^3$ is methyl.
7. The method of claim 1 wherein the compound is 2 - bromo-2'-methoxy-6'-*tert.* butyl-N-(acetamidomethyl) acetanilide.
8. The method of claim 2 wherein the compound is 2-chloro-2',6'-diethyl-N-(acetamidomethyl) acetanilide.
9. The method of claim 2 wherein the compound is 2 - chloro-2'-methyl-6'-ethyl-N-(acetamidomethyl) acetanilide.
10. The method of claim 2 wherein the compound is 2-chloro-2',6'-diethyl - N - (methoxyacetamidomethyl) acetanilide.
11. The method of claim 2 wherein the compound is 2-chloro-2',6'-dimethyl-N-(acetamidomethyl) acetanilide.
12. The method of claim 8 wherein the plants are soybean and the amount applied to the plants is a yield enhancing amount.
13. The method of claim 2 wherein the plants are turf grasses.
14. The method of claim 3 wherein the amount applied to the plants is a yield-enhancing amount.

References Cited

UNITED STATES PATENTS 3,475,155  10/1969  Ishida et al. _____ 71—118
3,547,620  12/1970  Olin _____ 71—118

GLENNON H. HOLLRAH, Primary Examiner

U.S. Cl. X.R.

71—118; 260—562 B